United States Patent
Herod et al.

[11] 3,692,383
[45] Sept. 19, 1972

[54] OPTICAL ANALOG DISPLAY DEVICE

[72] Inventors: Donald M. Herod, Davison; John C. Engelman, Lapeer; William J. Johnston, Flint, all of Mich.

[73] Assignee: General Motors Corporation, Detroit, Mich.

[22] Filed: Feb. 25, 1971

[21] Appl. No.: 118,846

[52] U.S. Cl. ............................. 350/96 R, 240/1 EL
[51] Int. Cl. ................................................. G02b 5/14
[58] Field of Search ................ 350/96 R; 240/1 EL

[56] References Cited

UNITED STATES PATENTS 2,591,864   4/1952   Peter et al. ........... 350/96 R X

*Primary Examiner*—David H. Rubin
*Attorney*—Jean L. Carpenter, Paul Fitzpatrick and Warren D. Hill

[57] ABSTRACT

A bar of light conducting material has notches formed in its rear face. The size of the notches are inclined at progressively different angles so that the efficiency of reflection of light toward the front face progressively varies along the length of the bar. Light filters of different colors are placed at each end of the bar and a lamp is provided adjacent each filter so that colored light is transmitted through the bar from each end to illuminate the sides of the notches so that the display apparent at the front face of the bar is a series of striated colored images. The color reflected from a given notch is a function of the relative intensities of light from the lamps. An electrical sending unit responsive to some condition varies the intensity of each lamp according to the amplitude of the condition. Thus as the condition changes, the striated bands progressively change in color.

3 Claims, 3 Drawing Figures

PATENTED SEP 19 1972

3,692,383

INVENTORS
Donald M. Herod,
John C. Engelman &
BY William J. Johnston

Warren D. Hill
ATTORNEY

OPTICAL ANALOG DISPLAY DEVICE

This invention relates to an optical analog display device and particularly to a bicolor display having no moving parts.

It is commonplace, as in automotive vehicles, for example, to monitor conditions such as temperature or liquid level by electrical means and display the information by an electromechanical gage. Such gages are bulky and expensive.

It is therefore an object of this invention to provide an optical display device responsive to an electrical signal which is inexpensive and compact.

It is another object of this invention to provide a bicolor analog display.

It is a further object of this invention to provide an analog optical display device having no moving parts.

The invention is carried out by providing an elongated body of light conducting material having a series of notches in the rear face and light sources of different colors at each end of the body to internally illuminate the surfaces of the notches so that the apparent color reflected from each notch surface is a function of the relative intensities of the light sources which vary according to a condition being monitored. The invention further contemplates that the notches be formed to have a progressively variable efficiency of reflection for each light source.

The above and other advantages of the invention will become more apparent from the following specification taken with the accompanying drawings wherein like reference numerals refer to like parts and wherein.

Figure 1:
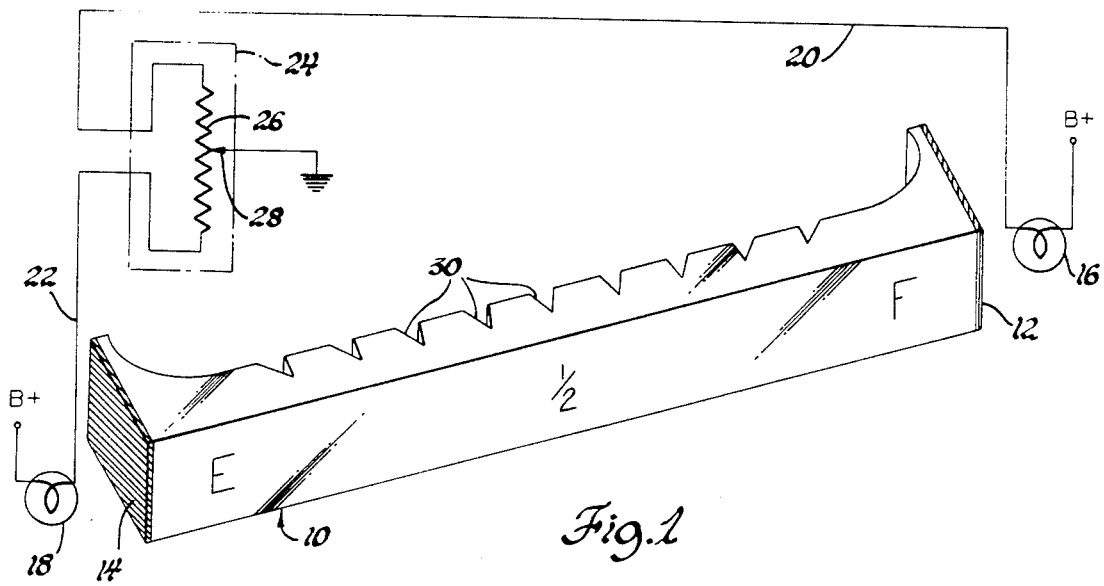
FIG. 1 is a perspective view of the optical display device according to the invention along with a schematic electrical circuit diagram of a liquid level sensor for operating the display device.

As illustrated in FIG. 1, the optical display device includes a bar 10 of light conducting material having a generally rectangular cross-section and enlarged at each end. By light conducting material is meant a transparent material which internally transmits light by the principle of total internal reflection. A suitable material is, for example, a transparent acrylic plastic. The enlarged ends of the bar 10 are covered by colored light filters 12 and 14. The filter 12 preferably is red and the filter 14 being green in color. Lamps 16 and 18 are positioned adjacent the filters for transmitting colored light therethrough into the bar 10. The enlarged ends of the bar 10 provide a large area for the efficient collection of light from the lamps. Each lamp has one side of its filament connected to a battery indicated as B+ and the other side connected through lines 20 and 22 to an electrical transducer 24 which is responsive to some condition which is desired to be monitored. In the example of FIG. 1, the transducer is a fuel level sensor and comprises a potentiometer 26 connected to the lines 20 and 22 having a grounded movable tap 28 which moves in response to a fuel level float, not shown. When the fuel reservoir is filled, the movable tap 28 is at the lower end of the potentiometer 26 and as the fuel supply diminishes, the movable tap 28 moves progressively toward the top of the potentiometer 26.

Figure 2:
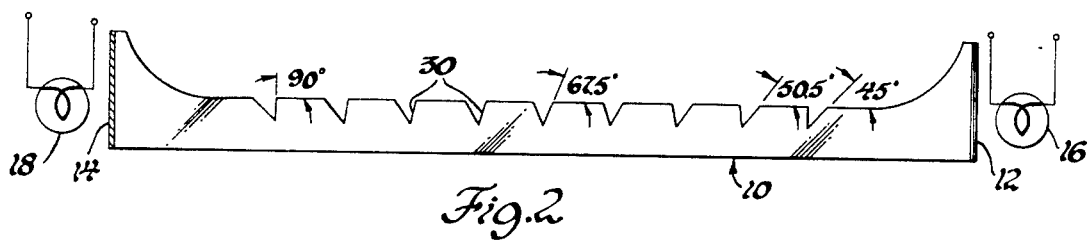
FIG. 2 is a plan view of a portion of the light conducting member of the display unit of FIG. 1; and, FIG. 3 is a front elevational view of the display unit of FIG. 1.

The rear surface of the bar 10 contains a series of vertically extending notches 30. As best shown in FIG. 2, each notch defines an included angle of about 45°, however, the notches are each different from the other in that the inclination of the notch sides varies according to the distance of the notch from the end of the bar 10. The extreme righthand notch has its right side inclined at an angle of 45° to the rear face of the bar 10. The next notch has its right side inclined at an angle of 50.5° with the rear face. The righthand slopes of the remaining notches progressively increase until finally the extreme lefthand notch has its right face disposed at 90° to the rear face. Where, as in the illustrated example there are a total of nine notches, the increment of notch inclination varies by about 5.5° between notches. The left sides of the notches are arranged in a manner identical to that of the right sides with the extreme lefthand notch having a left surface inclined at 45° and the left surface of the righthand notch being perpendicular to the rear face. The function of the notch faces is to reflect toward the front of the bar 10 light which is transmitted from either end of the bar. The various inclinations of the notch sides determines the reflection efficiency of each notch. Thus, the red light transmitted from the right end of the bar is most efficiently reflected by the 45° surface of the righthand notch and will be progressively less efficiently reflected by each of the succeeding notches. Similarly, the lefthand notch will most effectively reflect the green light from the left side of the bar. Even if the notches were uniform, a similar but less marked effect would occur since the light losses along the bar would cause the notches farther from the light source to be illuminated less well than those nearer the light source.

Figure 3:
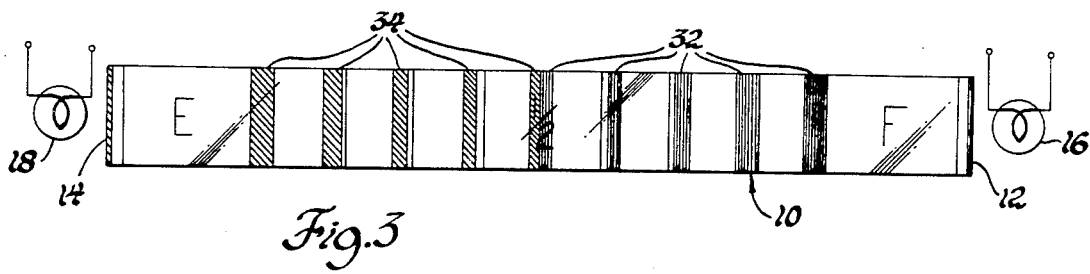

In operation, when the sliding tap 28 is in its center position indicating the fuel reservoir is half full, the lamps 16 and 18 will have equal intensity. The resulting display as seen by an observer looking at the front face of the bar 10 is depicted in FIG. 3. A striated display having a band of light representing each of the notches 30 will be visible. The bands represented by the hatched areas 32 will appear to be red while those represented by the hatched areas 34 will appear to be green. The central notch will be made up of a red and green band showing a sharp line of demarcation and the right notches will appear to be red only while the left notches will appear to be green only. This display then as shown in FIG. 3 accurately indicates that the fuel reservoir is one-half full. Even though some red light is reflected forward from the lefthand notches, the green light reflected therefrom is dominant so that the eye discriminates between the two colors and sees only the dominant green light. Therefore, the lefthand bands will appear to be totally green and similarly the righthand bands will appear to be totally red. When the fuel reservoir is full and the moving tap 28 is in its lowermost position, the lamp 18 will be at maximum intensity while the lamp 16 will be very dim. Then every light band on the display will appear to be green indicating a full reservoir. As the fuel level diminishes, the lamp 18 gradually becomes less intense while the light from the lamp 16 becomes more intense. Then one by one the color bands will change from green to red in progressive order until all of the bands will turn red when the fuel reservoir is empty or nearly so.

Of course, many other variations of the device will become apparent to those skilled in the art to enable improvements or special designs of the optical display without departing from the principles of the invention. For example, the size, number or shape of the notches may vary. The shape of the bar 10 may take other forms and obviously the filters 12 and 14 may be arranged in other manners. It will be seen, however, that the optical display according to this invention provides an inexpensive, reliable, compact and easily read analog display.

The embodiment of the invention described herein is for purposes of illustration and the scope of the invention is intended to be limited only by the following claims:

It is claimed:

1. An optical display device for providing a visual analog readout of a condition being monitored comprising an elongated body of transparent material having a front and a rear face, means for illuminating opposite ends of the body with light of different colors and variable intensity, the relative intensities of the lights of each color being a function of the condition, and a series of notches in the rear face to provide angularly disposed light reflecting surfaces for directing the light from each end toward the front face, whereby the apparent color of light reflected from each notch toward the front face depends upon the relative intensity of the light of each color.

2. An optical display device for providing a visual analog readout of a condition being monitored comprising an elongated body of transparent material having a front and a rear face, means for illuminating opposite ends of the body with light of different colors and variable intensity, the relative intensities of the lights of each color being a function of the condition, and a series of notches in the rear face to provide angularly disposed light reflecting surfaces for directing the light from each end toward the front face, the reflecting surfaces facing one end being disposed at progressively increasing angles relative to the rear face as the distance from the one end increases and the reflecting surfaces facing the other end being disposed at progressively increasing angles relative to the rear face as the distance from the said other end increases, whereby the apparent color of light reflected from each notch toward the front face depends upon the relative intensity of the light of each color.

3. An optical display device for providing a bicolor visual analog display of a condition being monitored comprising an elongated body of transparent material having a front and rear face, means at opposite ends of the body for internally illuminating the body with light of different colors and variable intensity, the relative intensities of the lights of each color being a function of the condition, means comprising a series of reflectors formed in the rear face for reflecting the light of each color toward the front face, the reflection efficiency of the reflectors progressively varying according to the distance of each reflector from an end of the body, whereby the apparent color of light reflected from each reflector toward the front face depends upon the relative intensity of the light of each color.

* * * * *